(12) United States Patent
Yutkowitz

(10) Patent No.: US 7,684,879 B2
(45) Date of Patent: Mar. 23, 2010

(54) AUTOMATING TUNING OF A CLOSED LOOP CONTROLLER

(75) Inventor: Stephen J. Yutkowitz, Cincinnati, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 339 days.

(21) Appl. No.: 11/751,133

(22) Filed: May 21, 2007

(65) Prior Publication Data

US 2007/0268068 A1     Nov. 22, 2007

Related U.S. Application Data

(60) Provisional application No. 60/801,959, filed on May 19, 2006, provisional application No. 60/801,946, filed on May 19, 2006.

(51) Int. Cl.
     *G05B 13/02* (2006.01)
(52) U.S. Cl. .............................. 700/29; 700/28; 700/30; 700/31
(58) Field of Classification Search .................. 700/18, 700/28–33, 37, 45, 46, 52, 54, 55, 170; 318/561, 318/563, 568, 607, 610, 632; 702/105, 145
See application file for complete search history.

(56) References Cited

U.S. PATENT DOCUMENTS

| | | | | |
|---|---|---|---|---|
| 5,929,400 | A  * | 7/1999 | Colby et al. .................. | 187/393 |
| 6,198,246 | B1 | 3/2001 | Yutkowitz | |
| 6,347,255 | B1 * | 2/2002 | Moser et al. .................... | 700/31 |
| 6,469,467 | B1 * | 10/2002 | Fujita .......................... | 62/228.4 |
| 6,917,049 | B2 * | 7/2005 | Krah et al. ................. | 250/559.1 |
| 6,917,838 | B2 * | 7/2005 | Kruger et al. .................. | 700/28 |
| 6,980,869 | B1 * | 12/2005 | Chandhoke .................... | 700/42 |
| 7,035,694 | B2 * | 4/2006 | Ramamoorthy et al. ....... | 700/18 |
| 7,057,366 | B1 * | 6/2006 | Tsai et al. .................... | 318/561 |
| 7,149,589 | B2 * | 12/2006 | Baba .......................... | 700/28 |
| 7,183,738 | B2 * | 2/2007 | Ikeda et al. .................. | 318/607 |
| 7,346,403 | B2 * | 3/2008 | Tanaka et al. ................. | 700/52 |
| 7,363,094 | B2 * | 4/2008 | Kumar ......................... | 700/29 |
| 7,395,124 | B2 * | 7/2008 | Schmidt et al. ............... | 700/29 |

(Continued)

OTHER PUBLICATIONS

Cao-Minh Ta; Hori, Y., "Convergence improvement of efficiency-optimization control of induction motor drives," Industry Applications, IEEE Transactions on , vol. 37, No. 6, pp. 1746-1753, Nov./Dec. 2001.*

*Primary Examiner*—Albert DeCady
*Assistant Examiner*—Dave Robertson
(74) *Attorney, Agent, or Firm*—Jose de la Rosa

(57) ABSTRACT

The present invention is a novel device, system, and method for simultaneous selection of filters and loop proportional gain for a closed loop system. According to an exemplary embodiment of the present invention, a method provides an automated selection of the portion of the controller known as the speed loop compensator. The method may operate on a frequency response function that represents the dynamic response from an actuation force (e.g. motor torque) to the sensor used for feedback of speed control (e.g. motor encoder angle). The frequency response function may be represented as a series of complex numbers each with a corresponding frequency value. The tuning method determines the combination of filter parameters that allows the loop proportional loop gain ($K_p$) to be maximized while meeting a specified set of criteria for stability margins. Methods for selecting integral gain and reference model are also presented.

18 Claims, 6 Drawing Sheets

U.S. PATENT DOCUMENTS 7,421,308 B2 * 9/2008 Nussbaum et al. .......... 700/186
7,432,681 B2 * 10/2008 Toyama et al. .............. 318/610
7,437,201 B2 * 10/2008 Cullen ......................... 700/29
7,496,041 B2 * 2/2009 Blevins et al. .............. 370/241
2003/0040817 A1 2/2003 Krah et al.
2005/0200327 A1 9/2005 Ikeda et al.

* cited by examiner

AUTOMATING TUNING OF A CLOSED LOOP CONTROLLER

CROSS-REFERENCE TO RELATED APPLICATIONS

This application claims priority to U.S. patent application No. 60/801,959 filed May 19, 2006 entitled "Method for Automating Tuning of a Closed Loop Controller", and to U.S. Patent Application No. 60/801,946 filed on May 19, 2006 entitled "Method for Automating Tuning of a Closed Loop Controller by Selection of Filtering Parameters", which are incorporated fully herein by reference.

TECHNICAL FIELD

The present invention relates to analyzing a frequency response function and more particularly, to a device, method, and system for selection of filters and loop proportional gain for a closed loop system.

BACKGROUND INFORMATION

Deployment of filters, proportional gains, and integral gains to comprise a speed controller's compensation equations is well established and this particular invention does not make new proposals in terms of the form or type of equations that execute in the control itself. Automation of "servo tuning" or controller "optimization" is less established, but nonetheless is also an area of significant prior art.

In U.S. Pat. No. 6,198,246, to Yutkowitz, Yutkowitz describes that an optimum value for a speed controller's proportional gain ($K_p$) could be determined by iteratively adjusting loop shaping filters to find the combination that yields the maximum $K_p$ while maintaining requirements for gain and phase margins (stability margins). The process involves manipulation of the system's open-loop frequency response function to evaluate the stability margins that result at each iteration. A specific set of rules for the automation of such a technique was not described, instead the Yutkowitz outlines an environment that would involve the interaction of a setup technician with the software via a graphical user interface, where the user would be responsible for selecting the optimal values based on immediate feedback from the graphical interface.

In U.S. Pat. No. 6,347,255, to Moser, Moser describes a technique for selecting notch filters to cancel mechanical resonances and enable increased gain. The Moser patent does not offer any guidelines for iterating the filter selection parameters. Rather, it describes only iteration of the proportional gain to match a predetermined template representing a model for approximate system dynamics. Once the proportional gain is determined filter selection is carried out in a single step. The two components of the compensator are determined separately, thus the interaction is not considered and the result will be less than optimal. Another difference is that the selection of proportional gain is based on amplitude of closed loop response rather than the examination of stability margins. Finally it does not offer suggestions of how to represent the concepts and algorithms in terms of object classes.

Accordingly, a need exists for a device, method, and system for quickly and efficiently selecting filters and loop proportional gain for a closed loop system.

SUMMARY

The present invention is a novel device, system, and method for simultaneous selection of filters and loop proportional gain for a closed loop system. According to an exemplary embodiment of the present invention, the method may generate a Frequency Response Function (FRF) of the system. The method may determine one or more resonant and anti-resonant frequencies of a speed controller of the system and estimate the total inertia of the system. The method may generate a Frequency Response Function for a current controller and loop pure time delays for the system. The method may determine a lower limit, an upper limit, and an initial candidate value for proportional gain (Kp) based on the estimated total inertia and FRF of the current controller and loop pure time delays and set a candidate value equal to the initial candidate value. The method may generate a complete Frequency Response Function that represents the system plant's Frequency Response Function multiplied by the current controller Frequency Response Function and loop pure time delays Frequency Response Function and the candidate value for Kp. The method may select a combination of loop shaping filters that suppresses amplitude at resonant frequencies to just meet a restriction for minimum gain margin. The method may then reduce the candidate value to meet the global minimum gain margin criterion. The method may optimize by using golden section search algorithm to determine a next candidate value. The method converges to the final candidate value by iterating the candidate value to the next candidate value and repeating actions of generating a complete Frequency Response Function through optimizing using golden section search algorithm for the next candidate value.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein.

DETAILED DESCRIPTION

Figure 1:
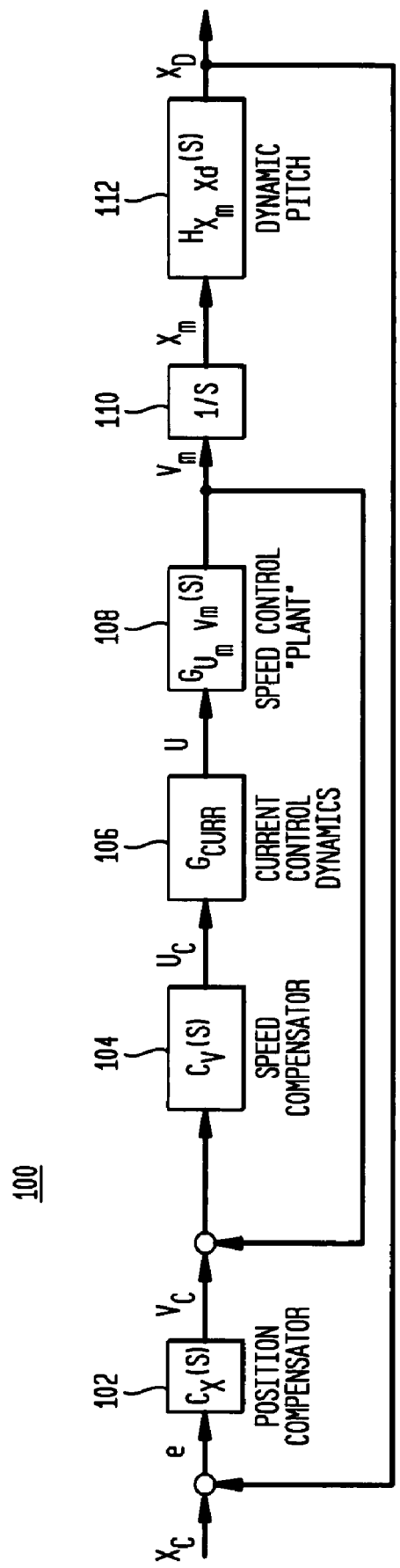
FIG. 1 is a control system block diagram of an exemplary system for selecting proportional gain and loop shaping filters according to an embodiment of the invention.

A set of methods for automated selection of the portion of the controller known as the speed loop compensator is disclosed. Specifically, outlined is a methodology for simultaneous selection of filters and loop proportional gain for systems that exhibit resonance effects. The exemplary methods operate on a Frequency Response Function (FRF) that represents the dynamic response from an actuation force (e.g. motor torque) to the sensor used for feedback of speed control (e.g. motor encoder angle). The FRF may be represented as a series of complex numbers each with a corresponding frequency value. The tuning method may determine the combination of filter parameters that allows the loop proportional loop gain ($K_p$) to be maximized while meeting a specified set of criteria for stability margins. Methods for selecting integral gain and reference model are also presented. The methods may be implemented in an object oriented software environment in order that the software implementation maps closely to a high level description of the algorithm.

A technique that may be incorporated into software for Automated Servo Tuning (AST) is discussed herein. The goal of AST may be to automatically configure values for parameters of the controlling equations of a motion control system based on data indicating the dynamic response the machine (moving member) whose motion is to be controlled. This data may be in the form of an analytical description or a measurement of the response of the mechanical system.

This method may be applicable to any control loop whose attainable gain is limited by resonances in the system under control, i.e. the "plant." The method and system has been deployed as part of Auto Servo Tuning (AST) and specifically for software for selecting compensators and loop shaping filters in a digital speed control loop for an electric motor. The exemplary method may be applicable to other situations that are not necessarily related to speed, motion, or electric motors. The requirement to commission/set-up the "compensator" deployed for speed control of electric motors is pervasive for almost any application requiring speed control. This includes cascaded controller architectures where the speed control loop is nested inside a position control loop. Some example applications are controlling axes of a machine tool, packaging machine, printing machine, or labeling machine. The overall goal of total automation of servo tuning is especially applicable when the control system (hardware & software) is intended for a wide range of applications where the appropriate or optimized settings are dependent on the dynamic behavior of the system under control, and where the expertise required to perform the machine commissioning would require additional cost and delays. Another application of AST is for cases where the machine is reconfigurable, such that a single controller may be required to control a machine whose dynamics can change based on configuration. An example of such a case occurs when a large mass is placed on a moving axis resulting in significant changes to the machine's dynamics. In this case a system that is capable of performing unattended automated servo tuning of the machine based on measurements of this new dynamic system would enable customizing the controller based on the changing dynamics of a reconfigurable machine depending on its present application. Another requirement of AST is to provide multiple alternative tuning strategies designed for application specific goals.

At each step in the description of the actions that will follow there are a number of alternative possibilities for accomplishing the requirements of the action. There are also alternative overall strategies. One alternative overall strategy may be to represent this problem as a generic constrained optimization. The problem with such an approach is that the constrained optimization may be in a high dimensional space (approximately 20-d).

Another alternative may be to use FRF measurements to generate an analytic model for the system dynamics, and base the tuning on the analytical model. With an analytical model techniques, for example, but not limited to, root-locus and pole-placement can be deployed. This may have the drawback that analytical models may lack robustness i.e. will not sufficiently reproduce the true dynamics in situations where the models are derived from the types of basic measurements that can be automated.

An exemplary method and system for selecting proportional gain and loop shaping filters is described relative to the control system block diagram of FIG. 1. The diagram 100 shows a common configuration for control of an electric motor regulating position and velocity of a dynamic load. It represents a simplified case of a common cascaded structure. Each block represents a transfer function explained as follows. In the diagram, Cx(s) 102 is the position control compensator, which typically contains a position control proportional gain and might also contain a loop shaping filter. Cv(s) 104 is the speed or velocity control compensator which will include at least a proportional gain, often an integral control term, and a number of loop shaping filters. Gcurr 106 represents the dynamic response of the closed loop current controller that supplies electrical current to the windings of a servo motor and also includes the effects of any communication delays in the speed control loop. GUm_Vm 108 is the portion of the dynamics of the mechanical system that represents the transfer function from motor torque or force to motor velocity; this is referred to as the "Speed Control Plant." The term 1/s 110 represents integration; in this case it relates motor position to motor speed. HXm_Xd 112 is the transfer function from motor position to the position of the machine where position is measured; it is given the name "Dynamic Pitch" and is a ratio of terms (numerators) from the mechanical system's transfer function matrix. The block diagram is simplified as it does not show a number of compensation blocks that are also commonly used. Among the compensation blocks not shown are speed loop reference model, speed feedforward, feedforward matching filter, and torque feedforward. An explanation of the signal names follows: $X_c$—position command, e—position error, $V_c$—velocity command, $U_C$—torque or force command, $U_M$—torque or force delivered by the motor, $V_M$—velocity of the motor, $X_M$—position of the Motor, $X_D$—position at the direct measurement device.

The speed compensator Cv(s) represents a combination of a P-I (proportional+integral) controller D(s) and a number of loop shaping filters Fi(s) that together are hereafter referred to as "current setpoint filters." The current setpoint filters may be configured to have either a low-pass characteristic or band-stop characteristic. Another name for band-stop filter is a "notch" filter. The components that comprise Cv(s) are defined in Equation 1. In equation (1), $K_p$ is the proportional gain, $K_1$ is the integral gain, the Ft(s) terms represent the current set-point filters, and Nfilt is the number of current set point filters configured.

$$Cv(s) = D(s) \cdot \prod_{i=1}^{Nfilt} F_i(s); \quad \frac{K_p(s + K1)}{D(s) = s} \qquad (1)$$

The tuning of the controller is more straightforward if $K_p$ represents the only proportional factor in $C_v(s)$, this is enforced by constraining the current setpoint filters such that they produce a net DC (0 frequency) gain of unity (2). This is often accomplished by constraining each individual filter to have unity gain at DC.

$$\prod_{i=0}^{Nfilt} Fi(s=0) = 1.0 \qquad (2)$$

The current setpoint filters serve the purpose of lowering the amplitude of the speed-loop's forward path, i.e. $C_v * G_{curr} * G_{Um\_vm}$, over frequency ranges where the phase of the forward path transfer function is close to 180 degrees. The amplitude attenuation is applied over frequency ranges that correspond to resonances present in the speed control plant $G_{Um\_vm}$. The process is not completely straight-forward because any amplitude attenuation is unavoidably accompanied by phase reduction at lower frequencies and the phase reduction spans a wider frequency range than the amplitude reduction. Generally speaking, notch filters have less phase reduction at frequencies below the operating frequency than would occur for a corresponding amplitude reduction of a low-pass filter. Sometimes low-pass filters are deployed because they have the characteristic that the amplitude reduction in the high frequency range is much greater than that of a notch filter. Typically low pass filters are used when there are many high frequency resonances whose frequencies are not certain, or when there are more salient resonances than the number of available notch filters.

Thus, a problem addressed by the current invention may be to optimize the deployment and parameterization of current set-point filters such that they provide just the right amount of amplitude attenuation while the accompanying phase loss is small enough to allow the proportional gain $K_p$ to be maximized.

The method is most easily described by first considering the nature of a certain type of mechanical system. The system to be considered as an example is a very common and useful approximation of a motion-controlled axis: it Consists of a number of masses or inertias connected in series with compliant and viscous couplings and with some degree of viscous coupling between each mass and the fixed reference frame. In this case, the mechanical system's speed control plant is the superposition of an integrator with a number of underdamped second-order transfer functions that produce system resonances and anti-resonances (as well as a first order low pass term to account for the viscous sliding friction). The presence of the low-pass characteristic of the current controller, $G_{curr}(s)$, as well as the time delays that occur in a discrete-time control system causes the phase of the forward path of the speed loop to pass through 180 degrees.

Figure 2:
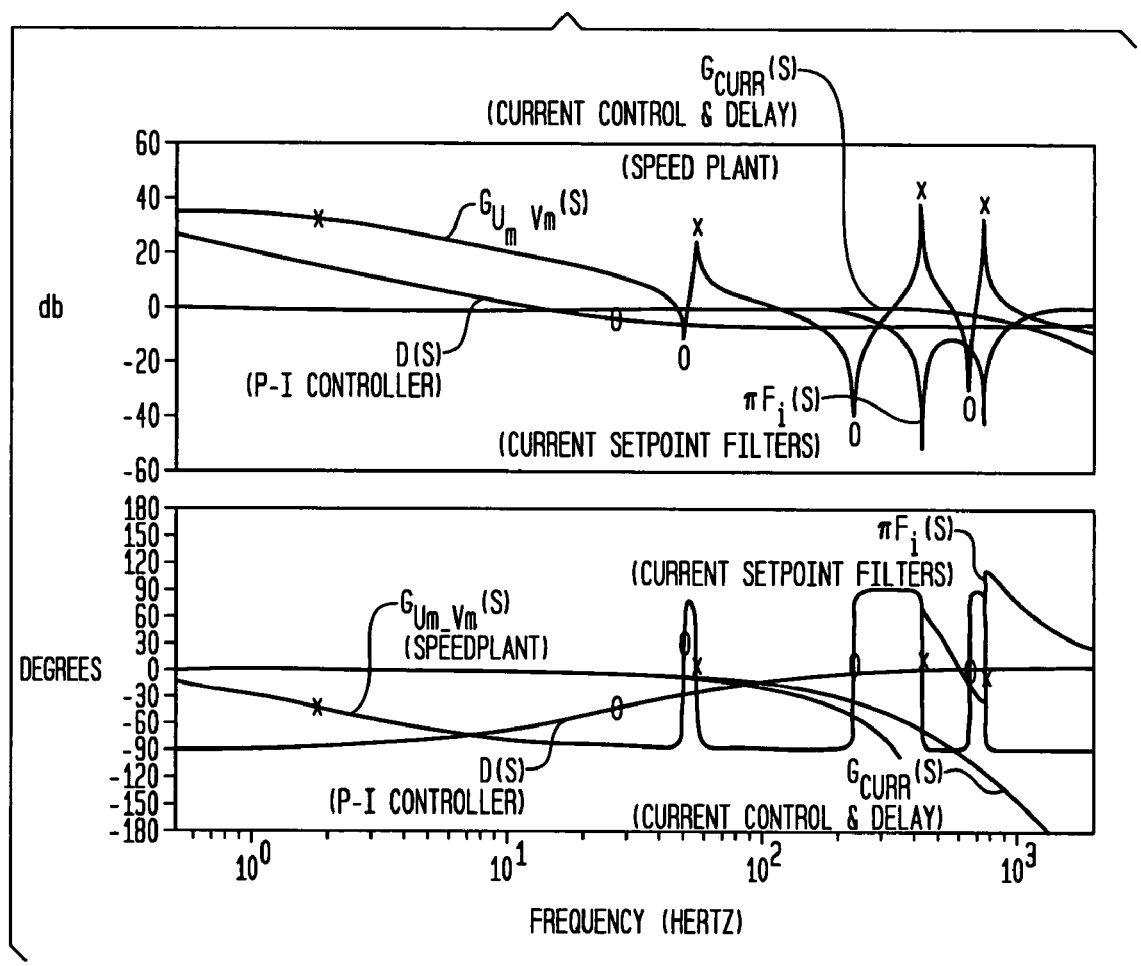
FIG. 2 is Bode plot of exemplary open speed loop component responses according to an embodiment of the invention.
Figure 3:
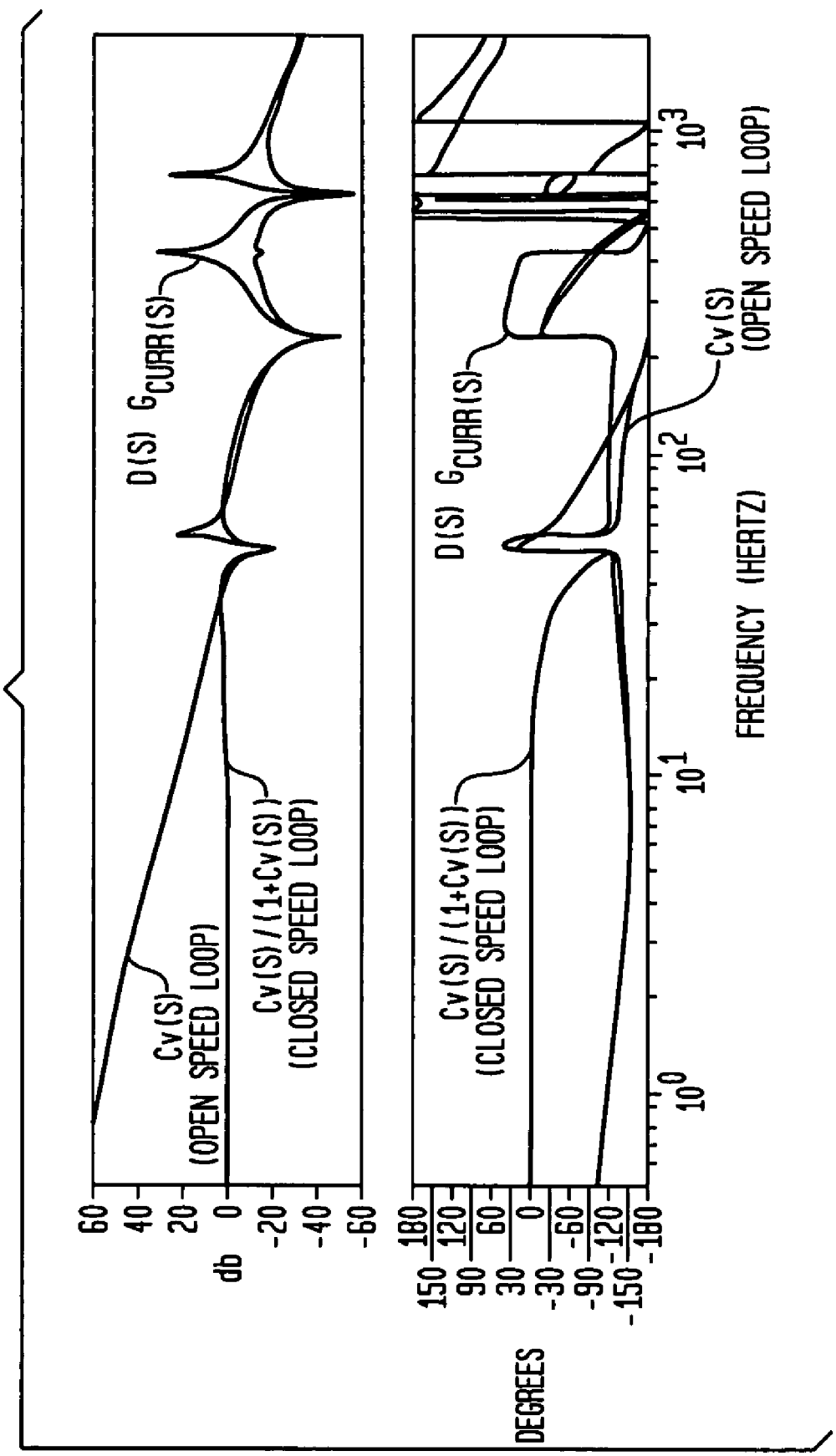
FIG. 3 is Bode plot of exemplary composite speed loop responses according to an embodiment of the invention.

An example of the terms in the speed controller forward path for such a mechanical system is contained in the Bode plots provided in FIGS. 2 and 3. In these diagrams an x indicates a pole and a 0 indicates a zero. The figures show the optimum choices for P-I control and current set-point filters.

It is apparent from the diagrams, that in this case two current set point filters configured as notch filters are deployed, the proportional gain $K_p$ is approximately $K_p = -5$ dB~=0.5 and the integral term is approximately $K_I = -30$ Hertz~=180 1/sec. The filters were chosen to cancel the resonances at ~400 Hz and ~800 Hz. No filter is necessary for the resonance at 60 Hertz because the phase in this region is sufficiently high.

Some general observations from this optimized result and the reasoning used to arrive at this result may lead directly to the automation method. The shape of the notch filters were chosen to provide just enough amplitude attenuation at the resonances such that the amplitude of the overall open-loop response with the optimized $K_p$ is at a level (below 0 dB) that corresponds to a minimum specified gain margin within the frequency range of the resonance. Notch filters are not used for resonances whose frequency neighborhood has a reasonably high phase and under conditions where moderate deviations in time delay or resonant frequency would not cause that condition to change.

This type of iteration is completely different from a general multi-dimensional constrained optimization. In the general case every possible parameter in the compensator $C_v(s)$ may be represented as an axis in multi-dimensional space. The optimization may be to iteratively test different combinations in this multi-dimensional space until the result converges to a combination that causes $K_p$ to be maximized while meeting the specified constraints for stability margins. Such an approach is not considered because the computation time would be unreasonable since the components of $C_v(s)$ for a case where there is a maximum of say four filters would be represented by approximately twenty parameters and the optimization problem would be in a twenty dimensional space.

The requirements of the algorithm may be that the proportional gain be maximized while simultaneously satisfying the following restrictions.

1. The minimum gain margin (GM) must be greater than or equal to a specified level (typical levels are 7-10 dB)
2. The minimum phase margin (PM) must be greater than or equal to a specified level (typical levels are 45-60 degrees).
3. The maximum number of loop shaping filters that may be used are limited to some specified value.
4. Each loop shaping filter may be configured to have either a low-pass characteristic or a notch-characteristic.
5. The amplitudes of salient resonances in the open speed loop that occur at frequencies above the frequency where the open-loop phase first traverses −180 degrees must be attenuated to be below some specified amplitude regardless of the phase at such resonances (typical levels are −7 to −10 dB.
6. The number of iterations on candidate values for $K_p$ must be limited to a specified value.

Implicit in restrictions 1 and 2 is the result that resonances that occur at frequencies somewhat below the first −180 degree crossing of the open loop response over frequency ranges where the phase is high need not be compensated by filters as they are damped by the closed loop controller itself. In this case a high phase refers to a frequency range where the phase is NOT in the range of −180+−PM. This is the reason why the integral control term $K_1$, can be set separately in a later independent step.

The reason for restriction 3 is that control systems cannot have an unlimited supply of filters as each additional filter requires additional memory and CPU utilization. The reason for restriction 4 is that a well designed control system may limit the total number of filters to maximize flexible use of the CPU and memory resources.

The reason for restriction 5 is that the relative amplitude-phase relationships for the high frequency range might not be consistent. A small drift in the frequency of a mechanical resonance could cause the resonant peak to occur at a frequency where the phase is much lower than previously. Shifts in resonances found in $G_{Um\_Vm}$ can occur due to moderate changes in the mechanical system. Likewise shifts in the phase can be caused by changes to the current control (possibly due to temperature effects).

General Procedure Sequence

The general step-by-step procedure employed in the tuning method is outlined below. Within the member data of the software objects for implementing this algorithm are FRF measurements or analytical transfer functions that represent the dynamic response of the open loop components of the speed loop: $D(s)$, $F_t(s)$, $G_{curr}(s)$, $G_{Um\_Vm}(s)$.

1. Measure or synthesize from an analytic expression an FRF that represents the linear dynamic response of the speed control plant $G_{Um\_Vm}(s)$.
2. Determine the resonant and anti-resonant frequencies (i.e. poles and zeros) of the speed control plant: $G_{Um\_Vm}(s)$.
3. Estimate the total inertia of the mechanical system.
4. Measure (or synthesize from an analytic expression) an FRF that represents the linear dynamic response of the current controller and loop pure time delays $G_{curr}(s)$.
5. Select lower limit, upper limit, and an initial candidate value for $K_p$ based on the inertia estimate and $G_{curr}(s)$. Each iteration's estimate for $K_p$ is designated by $\underline{K_p}$
6. Synthesize an FRF that represents $C_v(s)*G_{curr}(s)*\underline{K_p}$
7. Select a combination of current set-point filters $F(s)$ that suppresses the amplitude at resonant frequencies to just meet the restriction for minimum gain margin (The gain margin criterion is interpreted conservatively to mean that all open loop amplitudes for frequencies above the frequency where the phase traverses −180 must be at least −GM dB or less). The gain margin criterion is set as a parameter to the tuning strategy and typical values range from 6-10 dB.
8. Reduce $K_p$ to meet the global minimum gain margin criterion to accommodate any additional phase shifts introduced by the current setpoint filters. The reduced $K_p$ is designated as $K_{p\_}$final. In some cases, depending on the goal of the tuning strategy, an additional constraint that could be imposed for further lowering of $K_p$ to ensure that the closed loop amplitude is always at or below 1.0 could be imposed.
9. Use criterion of "golden section search algorithm" for numeric optimization to select the next candidate value of $\underline{K_p}$ where $-1*K_{p\_}$final is the cost function.
10. Repeat steps 6-8 until convergence of $K_{p\_}$final.

The details of each step of the general procedure 500 will be further elaborated in the discussions that follow. In many steps, addition, subtraction, multiplication, and division of numeric FRF's is involved. This is actually straight-forward: the required arithmetic is performed on the complex values from each FRF at corresponding frequencies. If frequencies do not match, then interpolation methods may be required. A variety of methods for interpolation and methods for merging FRF measurements with non-matching frequency spacing and ranges are known to individuals skilled in the art and may be utilized herein.

Block 502

"Measure or synthesize from an analytic expression an FRF that represents the linear dynamic response of the speed control plant $G_{Um\_Vm}(S)$."

The measurement of an FRF can be accomplished by intentionally exciting the system with a signal that contains energy over the relevant frequency range while collecting measurements of the torque producing current of the motor and the motor speed. The FRF estimate is composed using well documented techniques of system identification by means of Fourier analysis. The FRF may also be obtained from a model of a system by evaluating the model at discrete frequencies along the imaginary axis of the s-plane, i.e. $G(jw)$.

In the case of a measurement it is sometimes useful to "smooth" the measurement in the frequency domain to prevent "noise" from degrading the final result. The noise appears as deviations in the FRF that do not actually represent the dynamics of the system measured. The reasons for this noise can be from any number of factors including insufficient excitation/averaging, sensor quantization, system nonlinearity.

Block 504

"Determine the resonant and anti-resonant frequencies (i.e. poles and zeros) of the speed control plant: $G_{Um\_Vm}(s)$."

The frequencies where a resonance experiences a maximum amplitude and where an anti-resonance has a minimum amplitude correspond to the imaginary component of a pole and zero respectively. These frequencies may be required to be determined automatically by software. Methods for robustly determining these frequencies have been developed and are the topic of a separate invention disclosure.

Block 506

"Estimate the total inertia of the mechanical system."

The total inertia of the mechanical system is estimated by deploying a least squares criterion to fit the low frequency portion of the "speed plant" FRF $G_{Um\_Vm}$ to a function that represents a pure inertia exposed to viscous damping. When performing least squares curve fitting of complex frequency response functions it is necessary to perform the fit on the two sided frequency response (to enforce that the imaginary component is an odd function and the real component is an even function). Thus the low frequency range encompasses all frequencies $-f_0<f<f_0$. If the FRF function does not contain a negative frequency portion, a simple straight-forward procedure to synthesize the negative frequency portion based on known symmetry properties is utilized. The negative frequency portion is synthesized by computing the complex conjugate of the original function, reversing the order of the sequence, and eliminating the redundant point at 0 Hertz.

Several methods are available for selecting an appropriate value for $f_0$ that defines the low frequency range. One preferred method is to identify the first anti-resonance frequency in the speed control plant and to define $f_0$ as some fraction (e.g. ½) of the frequency of the first anti-resonance. Once isolated a frequency domain least-squares fit of the complex series of the two sided FRF is performed. The details of the systems of equations begins with the definition of the assumed low frequency dynamic, where J is the total apparent inertia at the motor, and B is the coefficient of viscous damping that acts on all system components as they move together in phase at a low frequency.

$$G_{Um\_Vm}(s) = \frac{1}{J \cdot s + B}$$

The matrix equation for a system of equations for multiple values of frequency $\omega$, is developed by evaluating the above at $s=j\omega$ and manipulating algebraically, where $\omega_0=2\Pi f_0$, and $\Delta\omega$ is the frequency spacing for the case of a uniformly spaced FRF.

$$\begin{bmatrix} -j\omega_0 \cdot G(-j\omega_0) & G(-j\omega_0) \\ -j(\omega_0 + \Delta\omega) \cdot G(-j(\omega_0 + \Delta\omega)) & G(-j(\omega_0 + \Delta\omega)) \\ \vdots & \vdots \\ j(\omega_0 - \Delta\omega) \cdot G(j(\omega_0 - \Delta\omega)) & G(j(\omega_0 - \Delta\omega)) \\ j\omega_0 \cdot G(j\omega_0) & G(j\omega_0) \end{bmatrix} \cdot \begin{bmatrix} J \\ B \end{bmatrix} = \begin{bmatrix} 1 \\ 1 \\ \vdots \\ 1 \\ 1 \end{bmatrix}$$

The solution to the above equations is accomplished using well known techniques such as singular value decomposition. While the viscous friction term B is not directly used, it must be included in the curve fitting process to avoid misattributing a viscous friction effect to the inertia J.

Block 508

"Measure (or synthesize from an analytic expression) an FRF that represents the linear dynamic response of the current controller and loop pure time delays $G_{curr}(s)$."

The FRF of the current controller can be estimated by a measurement analogous to that described in Step 2 for the speed controller. It may also be synthesized by considering the known electrical and magnetic properties of the motor and the pre-existing gains of the current control loop.

Block 510

"Select lower limit, upper limit, and an initial candidate value for $K_p$ based on the inertia estimate and Gcurr(s). Each iteration's estimate for $K_p$ is designated by $\underline{K_p}$."

Some idea of the range for reasonable values for $K_p$ must be determined in order to limit the range for the numeric optimization where $K_p$ is the independent variable. The $K_p$ range is determined by evaluating the maximum $K_p$ that would be possible if the system were perfectly rigid and the only limiting factor was the dynamic response of the current control and the system time delay, e.g.: $G_{curr}(S)$. The idealized frequency response of the open speed control loop may be synthesized by evaluating the following equation over the entire frequency range where the inertia J, is the result of the estimate from block 506.

$$H(\omega) = \frac{G_{CURR}(j\omega)}{J \cdot j\omega}$$

The lowest frequency where the idealized open loop phase for the purely inertial system passes through $-180$ degrees is determined, and the corresponding $K_p$ is selected directly from the amplitude at this location (w180) by considering the desired gain margin (e.g. GM=9 dB).

$$K_{p\_max} = \frac{10^{-GM/20}}{H(\omega = \omega_{180})}$$

Once this ideal value for $K_p$ is known it is used to represent the maximum value $K_{p\_max}$ in the optimization range. The minimum value for the $\underline{K_p}$ range is set to be some fraction of $K_{p\_max}$ (e.g $\frac{1}{10}$). The initial value could be any value in this range ($\frac{1}{2}$ $K_{p\_max}$ is a good candidate).

In the implementation of AST a software class hierarchy for representing dynamic systems had been developed. One of the methods for the software class allows one to easily search for frequencies where an FRF takes on certain characteristics; one example would be to find the frequency where the phase traverses a certain value with a negative slope.

Block 512

"Synthesize an FRF that represents $Cv(s)*Gcurr(s)*K_p$."

This is quite straight forward as it may involve just simply multiplication of FRFs.

Block 514

"Select a combination of current set-point filters F(s) that suppresses the amplitude at resonant frequencies to just meet the restriction for minimum gain margin (The gain margin criterion is interpreted conservatively to mean that all open loop amplitudes near resonance frequencies that are above the frequency where the phase first traverses −180 must be at least −GM dB or less . . . "

The procedure to complete this action is itself divided into a sequence of steps summarized below.

7.1 Identify frequency of "critical" poles of the total open speed loop and sort in order of decreasing amplitude. In this case, the open speed loop, $H_{OL}(W)$, is comprised of the available information:

$$H_{OL}(\omega) = K_P \cdot G_{CURR}(\omega) \cdot G_{Um\_Vm}(\omega)$$

A critical pole is identified as one whose amplitude is greater than the target value for gain margin and occurs at or above a frequency where the phase loss caused by $G_{curr}(jw)$ exceeds a pre-determined threshold value. The location (frequency) where the phase of $G_{curr}(jw)$ passes through a certain value is conveniently determined by a method of the FRF class. Reasonable values for the threshold phase loss are in the range 30-60 degrees. It is only necessary to find as many poles as there are available notch filters according to the capabilities of the system. In some cases, the number of notch filters considered may be made to be intentionally less than the true number available to either reserve a filter for later manual tuning or to include a pre-configured filter in the open loop system. In this latter case, the pre-configured filter must be included in the calculation of the open loop system.

7.2 Assign the first (highest amplitude) critical pole to a variable to represent the "active" pole $w_a$.

7.3 Construct a notch filter to attenuate the amplitude in the frequency range affected by the "active" pole. The notch filter is represented by a class that has among its constructors a variant that determines the object's member data based on analysis of a frequency response function object provided as an input argument to the constructor: i.e. $H_{OL}$. Additional input arguments to the constructor for notch filter are the center frequency and maximum amplitude of the modified FRF over the specified range. The center frequency is the frequency $\omega_a$, the maximum amplitude is the target gain margin GM converted to an amplitude. The notch filter's member data is in terms of center-frequency, bandwidth, and maximum attenuation. The constructor determines the appropriate parameterization of the filter that results in the adjusted FRF meeting the specified maximum amplitude requirement over the specified frequency range.

The details of the notch filter construction are summarized in the following. In this discussion we use $H_{OL}(\omega)$ to represent the FRF, but it must be understood that the same logic applies to any FRF that contains resonance peaks.

First, the frequency range of the FRF over which the resonance has a significant impact is determined. This is done by finding the highest frequency over the range 0 to $\omega_a$ where the amplitude of $H_{OL}(\omega)$ passes through the specified maximum amplitude $|H|_{max}$ with a positive slope: this frequency is designated as $w_{Left}$ and designates the starting frequency of the resonance's candidate value for approximate range of influence. Similarly, the high limit of the approximate range of influence, $w_{Right}$, is determined by finding the lowest frequency above $\omega_a$ where the amplitude passes through $|H|_{max}$ with a negative slope. The computed range of influence is based on the larger of the two deviations $\omega_{1/2}=\max((\omega_a-\omega_{Left}), (\omega_{Right}-\omega_a))$ so range of influence is $(\omega_a-\omega_{1/2})$ to $(\omega_a+\omega_{1/2})$. For cases where the conditions for one of $\omega_{Left}$ or $\omega_{Right}$ don't exist, the approximate range of influence is determined based on the value that does exist.

The bandwidth of the notch filter could be based directly on a factor derived from $\omega_{1/2}$, e.g., $4*\omega_{1/2}$. Similarly, the attenuation could be determined directly from the ratio of the required maximum gain to the resonance amplitude at $\omega_a$. Additionally, iterations can be performed to assure that the amplitude is at or below the target amplitude everywhere in the resonance's range of influence.

While the previous approach will work, it does not make an attempt to conserve the limited number of filters available for cases where two lightly damped resonances occur close together and could be effectively treated with a single notch filter rather than consuming two of the available filters. In order to accommodate such a possibility, the procedure described above can be repeated by finding the width of an extended range of influence by considering an amplitude lower than that specified, for example: $\frac{1}{2}*|H|_{max}$. In this case, the determination of the range of influence is less sensitive to fluctuations near the resonance frequency. Once the extended range of influence is determined, the maximum value of the amplitude over that range defines the new center frequency for the notch filter. The bandwidth of the notch filter is based on the extended range of influence, and the attenuation is computed to reduce the amplitude everywhere in the extended range to $|H|_{max}$. If these rules cannot cause the amplitude to be at the required level throughout the range, then iterations are performed. The independent variable in the iterations is the bandwidth, and for each bandwidth the attenuation is computed for the center frequency. The cost function of the iterations is the absolute value of the difference between the maximum amplitude value in the frequency range and the desired maximum amplitude value in the range.

If, after designing the notch filter as described, the attenuation at the center frequency turns out to be a small value, e.g.: less than 1 dB, then the filter should not be utilized at that frequency and the filter slot should be conserved for use as a notch at another frequency or as a possible low pass filter.

This approach is based on the idea that the damped natural frequency of the resonance is determined, but that the damping of the resonance remains unknown. This corresponds to knowing the imaginary component of a complex-valued pole, but not knowing the real component. If the real and imaginary component of each pole could be determined precisely, then a notch filter to reduce the resonance to a required value could be computed directly. Methods for determining the full analytical expression for an oscillatory pole are discussed in a separate disclosure document.

7.4 Augment the open loop FRF to include the effects from the recently designed notch filter.

$$H_{OL}(\omega)=K_p*G_{curr}(\omega)*G_{Um\_Vm}(\omega)$$

7.5 Assign variable Wa the next critical pole in the list and return to step 7.3. Stop looping back to 7.3 when the list of critical poles is exhausted.

7.6 Use any remaining available filters configured as a low pass filter if necessary. The software object that represents a low pass filter has a constructor variant that accepts input arguments of an FRF, a value for the starting frequency where the amplitude must be below a specified level, and the target maximum amplitude for the frequency range. The constructor then iterates its value for cutoff frequency until the maximum amplitude in the specified frequency range is equal to the target amplitude. The cost function for iterations in this case is the absolute value of the difference between the target maximum amplitude and the maximum amplitude that occurs in the frequency range of interest when the candidate low pass filter is multiplied by the input FRF. It is assumed here that for filters of order higher than 1, that a standard configuration (such as Butterworth) is chosen such that only the cutoff frequency is a selection variable.

The sequence 7.1-7.6 represents one possible strategy of attempting to use all notch filters and only use a low-pass filter to take care of remaining resonances or FRF noise in the high frequency range. Another alternative would be to reserve one of the available filters for use as a low-pass, such that step 7.6 always has an available filter to work with. Similarly two filters for implementation as a low pass can be reserved. It is conceived that this action can be executed a number of times equal to the number of total filters available. The combination that meets the requirements with the least additional phase loss is chosen as the result to use (the output from this step). The least additional phase loss may be characterized as the result where the total open speed loop FRF has the lowest frequency where −180 degrees is crossed for the first time.

Block 516

"Reduce $K_p$ to meet the global minimum gain margin criterion to accommodate any additional phase shifts introduced by the current setpoint filters. The reduced $K_p$ is designated as $K_{p\_final}$ ..."

Since the current set-point filters will necessarily introduce phase loss, this step might be necessary to maintain the gain-margin criterion. For any iteration it may or may not be necessary to reduce $K_p$. The approach for reducing $K_p$ is highly analogous to that used in the simple case of block 510. The difference is in the make-up of H(s): 1/(Js) is replaced by the measured speed plant $G_{Um\_vs}(s)$, and is multiplied by an additional synthesized FRF to represent the total effect of the present iteration's choice for current setpoint filters $F_{tot}(s)$.

An alternative or additional requirement could be to limit the maximum closed loop amplitude of the proportional-gain-controlled speed loop. In cases where the speed controller is augmented with a reference model (a discussion of reference models is present later) and where speed feed forward is to be implemented in the position loop, it is advantageous that the proportional gain controlled speed loop exhibit a behavior where the amplitude of the closed speed loop never exceeds 1.0. The requirement that the closed loop amplitude of the proportional-only-controlled speed-loop be 1.0 or less would be imposed at this step if called for in the strategy. The maximum $K_p$ gain that meets this constraint could be found by iteration, but a direct approach has been discovered. The following equation represents limiting value for $K_p$ computed for every frequency in the FRF.

$$K_p(\omega) = \frac{-\frac{1}{2}}{\mathrm{RE}(G_{CURR}(j\omega) \cdot G_{Um\_Vm}(j\omega) \cdot F_{TOT}(j\omega))}$$

$$K_p = \min(K_p(\omega) \forall \ (K_p(\omega) > 0))$$

A derivation and explanation of this direct approach is found later in the description. From this relation an algorithm for finding the maximum $K_p$ that meets this requirement may be developed, by evaluating the above equation to compute $K_p$ at each frequency and to select the minimum among the positive instances of values of $K_p$.

Block 518

"Use criterion of 'golden section search algorithm' for numeric optimization to select the next candidate value of $K_p$ where $-K_{p\_final}$ is the cost function."

The golden section search is a well established algorithm for numerical optimization that determines the value of a variable that minimizes a cost function. In this case the cost function is the negative final value for the most recent iterations choice for proportional gain: $-K_{p\_final}$. The cost function is the negative final gain because our objective is to maximize $K_{p\_final}$. The input variable is the candidate value. Normally with numeric optimization the input value is the sought after result, but interestingly, in this case it is the minimum cost function that is the sought after result.

Block 520

"Repeat through action 512 until convergence of $-K_{p\_final}$."

The convergence criterion is based on selection of a resolution for $K_p$ derived from $K_{p\_max}$. A reasonable value is $K_{p\_max}/100$.

Integral gain $K_1$

The integral gain is determined by iteratively selecting values for $K_1$ and finding the maximum value that results in a minimum phase margin that is greater than a specified target value (typical values chosen for target PM are in the range of about 45-60 degrees). Since the phase margin for a given $K_1$ cannot be determined in advance from a closed form equation, iterations in candidate values for $K_1$ are required. The iterations use a golden section search algorithm whereby the open-speed-loop dynamics for the candidate $K_1$ are synthesized and the cost function is the absolute value of the difference between the minimum phase margin in the synthesized FRF and the target phase margin.

Alternatively, the $K_1$ can be selected based on a cost function that is a representation of the dynamic compliance relative to force disturbances. Some examples of cost functions based on dynamic compliance are the maximum amplitude of the dynamic compliance frequency response, the integral of the dynamic compliance frequency response amplitude over a certain frequency range, or the average value of the first few maximum amplitude peaks in the compliance response. The dynamic compliance response for a case where the structural component of the response is assumed rigid can be obtained by manipulating the terms already determined: D(s), $G_{curr}$, $GU_{m\_Vm}(s)$, $F_{tot}(s)$. This represents the inverse disturbance rejection of the speed loop, i.e. the disturbance transmission.

$$H_{compliance} = \frac{G_{Um\_Vm}(s)}{s(1 + D(s) \cdot G_{CURR}(s) \cdot F_{TOT}(s) \cdot G_{Um\_Vm}(s))}$$

Reference Model

So far, all the tuning considerations were related to the example system shown in FIG. 1. The block diagram in FIG. 1 does not contain the speed loop "reference model." The purpose of the reference model is to cause the tracking behavior of the speed loop to behave as if the speed control integral gain ($K_1$) were not present. The integral gain is present to provide improved immunity to external disturbances (forces). A closed loop system with integral gain can have an amplitude response with a small peak (greater than 0 dB) created by the additional phase loss and numerator zero introduced by the integrator. A proportional only system has no such "peak." The reference model is especially useful in cases where speed feedforward is implemented in the position controller. The reference model is less important when speed and acceleration (torque) feedforward are both implemented. It must be understood that the previously described auto tuning strategies for determining $K_p$, $K_1$, and $F_{tot}$ require no modifications to account for the deployment of a reference model. A control loop structure that contains a reference model R(s) is shown in FIG. 4.

Figure 4:
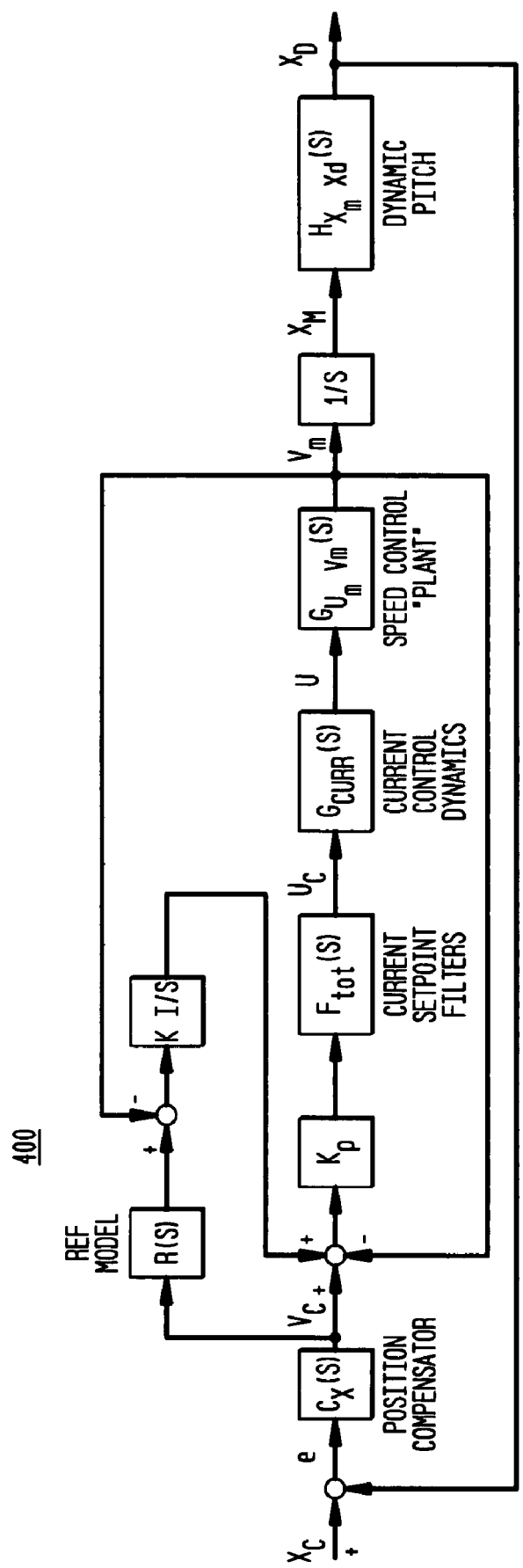
FIG. 4 is a control system block diagram of an exemplary system for selecting proportional gain and loop shaping filters with reference model included according to an embodiment of the invention
Figure 5A:
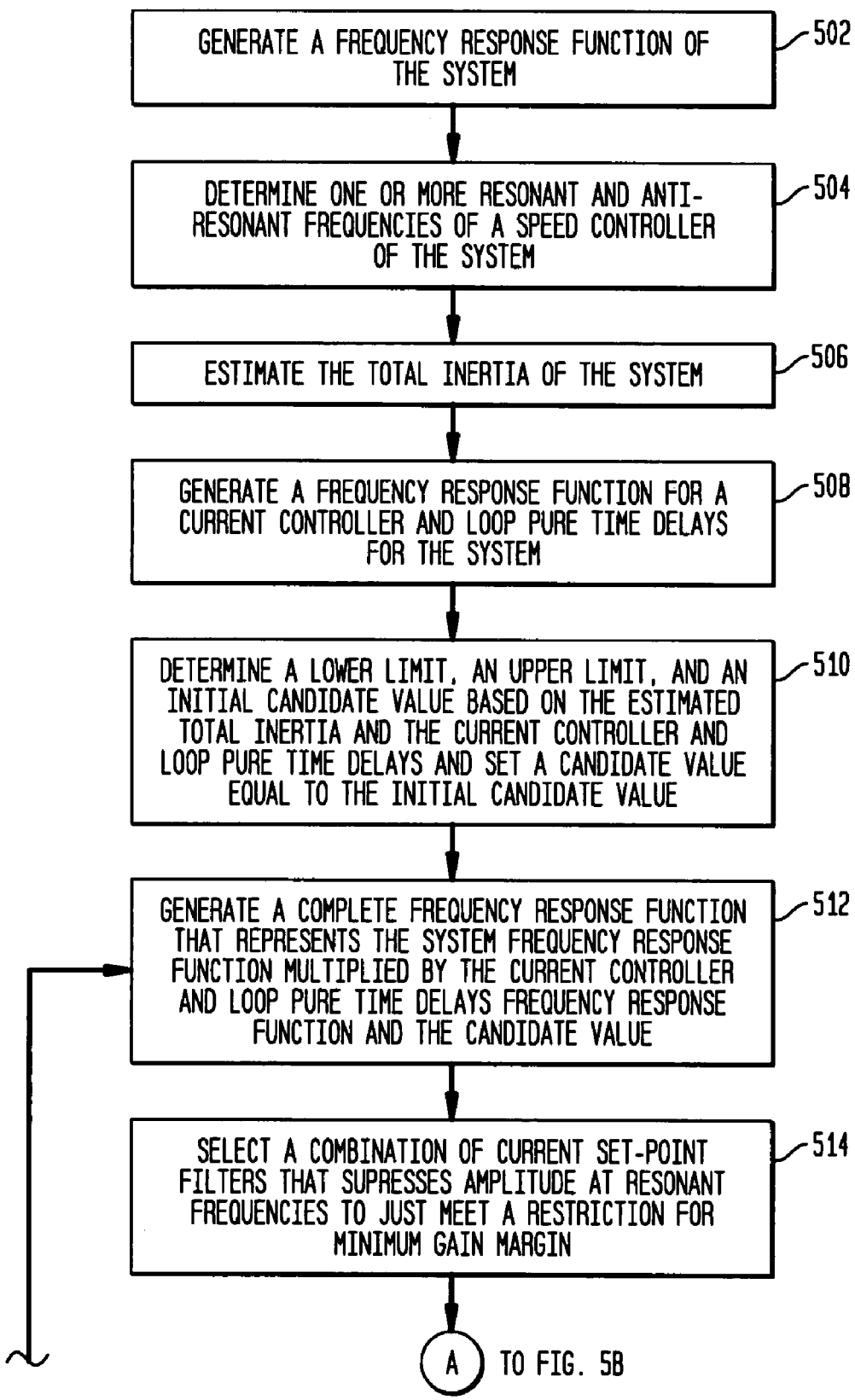
FIGS. 5A and 5B are a flowchart of a method for simultaneous selection of filters and loop proportional gain for a closed loop system 500 according to an exemplary embodiment of the present invention.
Figure 5B:
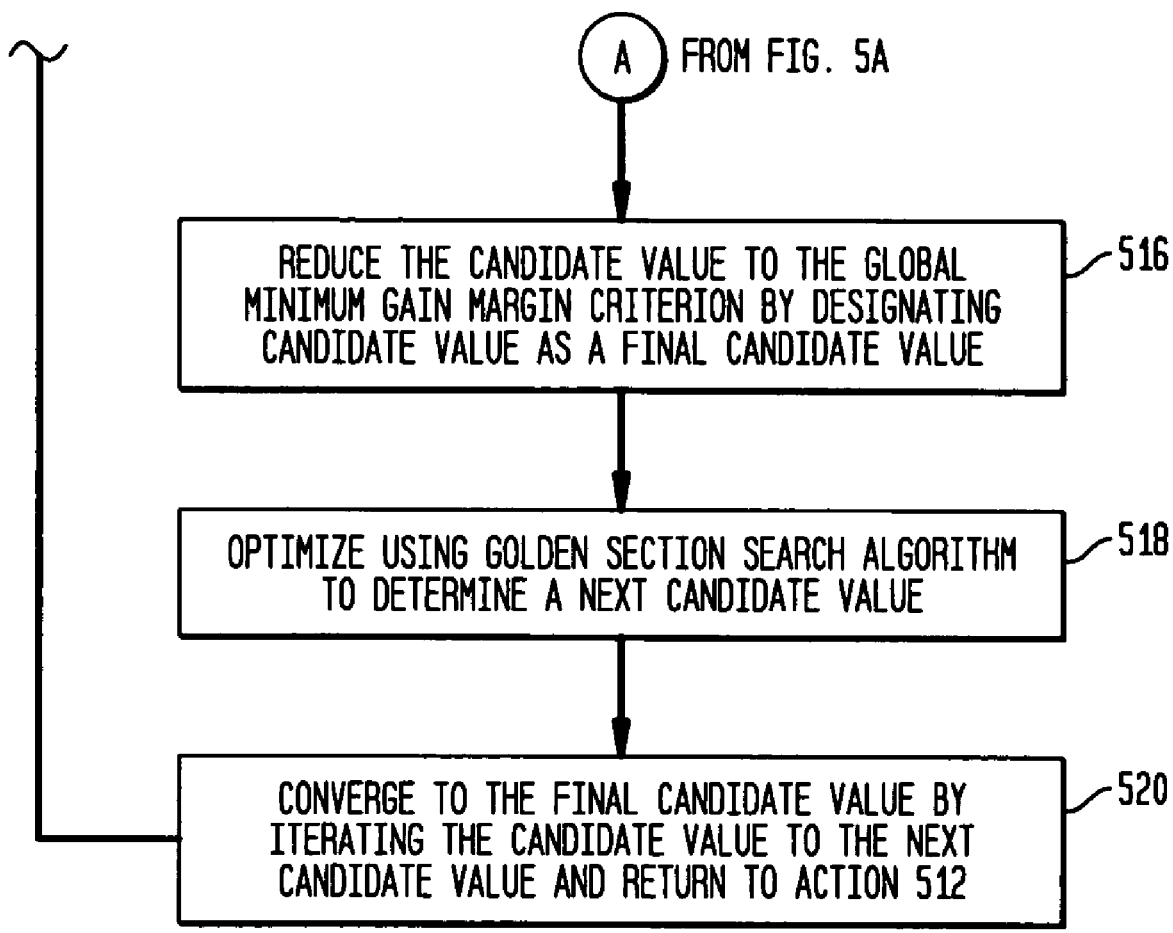

Examination of FIG. 4 reveals that the effect of the integrator $K_1/s$ on the forward path response from Vc to VM is eliminated if the reference model can exactly duplicate the response from $V_c$ to $V_M$ for the imagined case where $K_1$ is 0. This means the reference model is optimized when its dynamics duplicate the dynamics of the closed speed loop with proportional-only control.

The optimum reference model is determined by selecting a template filter whose structure represents a model for the expected low frequency behavior of the closed position loop response with a proportional-only compensator. The analysis is limited to the low frequency portion of the FRF as it is expected that any reasonable assumed structure will break down at higher frequencies where mechanical resonances occur. The numeric parameterization of the reference model is then determined by finding the best fit model for the low frequency portion of the closed speed controller in the least squares sense. The closed loop speed control for a proportional only compensator is synthesized by manipulating the loop response determined earlier: $H_{cl}(s)=K_p*F_{tot}(s)*G_{curr}(s)*G_{Um\_Vm}(s)$; $H_{cl}(s)=H_{01}(s)/(1+H_{01}(s))$.

Details of this method will be demonstrated for a case where the structure for R(s) is assumed to be a second-order low-pass filter plus pure time delay. Such a structure is chosen because it represents the closed loop dynamics for a case where all mechanical components move together in phase as a single lumped inertia, there is no significant effect from the current set-point filters, and the response of the current controller can be approximated by a first order low pass filter plus pure time delay. The reference model is then assumed to have a form as follows, where the unknown parameters are the pure time delay $T_0$, the undamped natural frequency $\omega n$, and the damping coefficient $\xi$.

$$R(\omega) = \frac{\omega_n^2}{-\omega^2 + j \cdot 2\zeta\omega_n \cdot \omega + \omega_n^2} \cdot e^{-j\omega T_0}$$

The presence of the pure time delay $T_0$, necessitates that, in order to find the best fit R for approximating $H_{cl}$, iterations be performed. The value for $T_0$ is the independent variable for the iterations. In every iteration, a normal single step least-squares optimization is performed to obtain that iteration's guess for $\xi$ and $\omega_n$. The least squares optimization is performed over a limited frequency range on a two sided FRF. The methods for choosing the frequency range and synthesizing a "two sided" response are identical to those discussed above with regard to block 506. The relative importance at each frequency may be further specified by providing a weighting function: a series of positive real numbers for each frequency in the range that describe the relative importance at each frequency. One way of generating an appropriate weighting function is to compute the amplitude squared of a low pass filter evaluated at the same frequencies contained in the FRF $H_{Cl}(\omega)$. The solution to a least squares problem with a weighting function is well established and need not be repeated here.

The cost function for a given iteration is the sum over frequencies of the weighting function $W(\omega)$ times the square of the difference between the R(ω) for that iteration and the $H_{Cl}(\omega)$ for each ω over a frequency range limited to the low frequency portion. The sum of the errors squared applies to the amplitude squared of the complex number: that is the difference between the evaluation of R(ω) at a certain $\omega=\omega_i$ and $H_{Cl}(\omega)$ at the same $\omega=\omega_i$. The range for $T_0$ is selected in advance based on a-priori knowledge about the expected range of pure delays in the control system's software and electronic hardware A golden section search algorithm is deployed to select candidate values for To on successive iterations.

The form of the systems of equations for estimating values for ξ and $\omega_n$ during each iteration is shown below. The equations below indicate a uniformly spaced frequency vector only to demonstrate the concept, the same system applies equally well to non-uniformly spaced frequency vectors. The term $e^{jwT0}$ is present to remove the present iteration's proposed pure time delay from the synthesized closed loop system.

$$H_i(\omega) = H_{CLi}(\omega) \cdot e^{+j\omega T_0(i)}$$

$$\begin{bmatrix} (H_i(-\omega_0)-1) & H_i(-\omega_0) \\ (H_i(-\omega_0+\Delta\omega)-1) & H_i(-\omega_0+\Delta\omega) \\ \vdots & \vdots \\ (H_i(\omega_0-\Delta\omega)-1) & H_i(\omega_0-\Delta\omega) \\ (H_i(\omega_0)-1) & H_i(\omega_0) \end{bmatrix}.$$

$$\begin{bmatrix} \omega_n^2 \\ \zeta \cdot \omega_n \end{bmatrix} = \begin{bmatrix} (-\omega_0)^2 \cdot H_i(-\omega_0) \\ (-\omega_0+\Delta\omega)^2 \cdot H_i(-\omega_0+\Delta\omega) \\ \vdots \\ (\omega_0-\Delta\omega)^2 \cdot H_i(\omega_0-\Delta\omega) \\ (\omega_0)^2 \cdot H_i(\omega_0) \end{bmatrix}$$

In a preferred embodiment, the implementation of a software class to represent a reference model contains as member data an instance of a pure time delay class and an instance of a second order low-pass filter class (PT2). The constructor for an object whose class is a PT2 has a variant that accepts an FRF object that is expected to be approximated as the response of a system with second order low pass dynamics and an optional weighting function. The least squares solution for obtaining ξ and $\omega_n$ is executed by the PT2 constructor function and a PT2 object with the optimal settings of ξ and $\omega_n$ is instantiated. Furthermore, the reference model class has a constructor variant where the range limits of possible time delays are provided along with the measured or synthesized closed loop proportional-only response $H_{CL}$, and an optional weighting function. The execution of this variant of the reference model constructor successively invokes the PT2 constructor while iterating over the range of TO, removing the proposed pure delay from the $H_{CL}$, and implementing the rules of the golden section search until convergence to the optimal result. In such a way, the client of a reference model need only limit the frequency range, select a range of possible time delays, and optionally choose a weighting function. The reference model constructor will generate the optimal reference model without requiring the client software (a particular task in a particular tuning strategy) to be responsible for the methodology of selecting the best possible reference model.

Derivation of Equation for Unity Closed Loop Amplitude

This section derives the equation for the maximum gain that meets a requirement that the closed loop response maximum amplitude is 1.0 or less. This approach is generally applicable to any proportional gain controlled feedback loop.

Given:
Open Loop Plant: G(s)
Constant Gain: K
Closed Loop System: H(s)

$$H(s) = \frac{K \cdot G(s)}{1 + K \cdot G(s)}$$

Find the maximum value of K that results in the amplitude of the closed loop frequency response having a magnitude of 1.0 or less for all frequencies.

$$\left\| \frac{K \cdot G(s=j\omega)}{1+K \cdot G(s=j\omega)} \right\| \leq 1.0, \forall \omega$$

This leads to:

$$\|K \cdot G(j\omega)\| \leq \|1+K \cdot G(j\omega)\|, \forall \omega$$

Or more conveniently . . .

$$\|K \cdot G(j\omega)\|^2 \leq \|1+K \cdot G(j\omega)\|^2, \forall \omega$$

Lets represent G(jω) in polar form:

$$G(j\omega) = g(\omega) \cdot e^{j\phi(\omega)}$$

Or the following where g=g(ω) and Φ=Φ(ω), is understood $$G(j\omega) = g \cdot e^{j\phi}$$

So the inequality can now represented as:

$$K^2 g^2 \leq \|1+Kg \cdot e^{j\phi}\|^2$$

Which expands to:

$$K^2 g^2 \leq \|1+K \cdot g \cdot \cos(\phi)+j \cdot K \cdot g \cdot \sin(\phi)\|^2$$

Evaluation of the magnitude squared on the right yields:

$$K^2 g^2 \leq 1+2 \cdot K \cdot g \cdot \cos(\phi)+K^2 g^2 \cos^2(\phi)+K^2 g^2 \sin^2(\phi)$$

The identity from trigonometry: $\sin^2(a)+\cos^2(a)=1$ is deployed to reduce the inequality to:

$$K^2 g^2 \leq 1+2 \cdot K \cdot g \cdot \cos(\phi)+K^2 g^2$$

Next we recognize that:

$$g(\omega) \cdot \cos(\phi(\omega)) = RE(G(j\omega))$$

The inequality finally reduces to $$2 \cdot K \cdot RE(G(j\omega)) \geq -1$$

Since G is the transfer function of a stable system its real part will always be negative. When the previous equation is re-arranged with the less-than becoming a greater-than, the result is a requirement on K for each frequency ω.

$$K(\omega) \leq \frac{-\frac{1}{2}}{RE(G(j\omega))}$$

The maximum proportional gain K, is then the minimum of K(ω) evaluated at all frequencies contained in the numeric representation of G.

The present invention is not intended to be limited to a system, device, or method which must satisfy one or more of any stated or implied object or feature of the invention and is not limited to the exemplary embodiments described herein. Modifications and substitutions by one of ordinary skill in the art are considered to be within the scope of the present invention.

The invention claimed is:

1. A method for simultaneous selection of filters and loop proportional gain for a closed loop system comprising the actions of:
    (a) generating a Frequency Response Function of the system;
    (b) determining one or more resonant and anti-resonant frequencies of a speed controller of the system;
    (c) estimating the total inertia of the system;
    (d) generating a Frequency Response Function for a current controller and loop pure time delays for the system;
    (e) determining a lower limit, an upper limit, and an initial candidate value gain based on the estimated total inertia and knowledge of the dynamic response of the current controller and loop pure time delays and set a candidate value gain equal to the initial candidate value;
    (f) generating a Frequency Response Function that represents the system plant Frequency Response Function multiplied by the current controller and loop pure time delays Frequency Response Function and the candidate value gain;
    (g) selecting a combination of current set-point filters that suppresses an amplitude at resonant frequencies to just meet a restriction for minimum gain margin;
    (h) reducing the candidate value gain to satisfy the global minimum gain margin criterion and designating candidate value as a final candidate value;
    (i) optimizing using golden section search algorithm to determine a next candidate value; and
    (j) converging to the final candidate value by iterating the candidate value to the next candidate value and repeating action (f) through (j).

2. A method of claim 1, wherein the minimum gain margin includes all open loop amplitudes near resonances for frequencies above some fraction of the frequency where the phase transverses −180 degrees.

3. A method of claim 1, wherein a gain margin associated with the minimum gain margin is set as a parameter to the tuning strategy.

4. A method of claim 1, wherein reducing the candidate value for proportional gain includes ensuring that the amplitude is always at or below 1.0.

5. A method of claim 1, wherein a design of the filters for the closed loop system is based the candidate value gain.

6. A method of claim 1, wherein the action of estimating the total inertia of the system involves estimating by using a least squares criterion to fit a low frequency portion of the speed controller to a function that represents a pure inertia exposed to viscous damping.

7. A system for automatically adjusting filters and gain for a control loop of actuators and sensors in a plant comprising:
    a processor for executing instructions;
    a memory in communication with the processor and for storing the instructions, the memory comprising:
    a module (a) for generating a Frequency Response Function of the system;
    a module (b) for determining one or more resonant and anti-resonant frequencies of a speed controller of the system;
    a module (c) for estimating the total inertia of the system;
    a module (d) for generating a Frequency Response Function for a current controller and loop pure time delays for the system;
    a module (e) for determining a lower limit gain, an upper limit gain, and an initial candidate value gain based on the estimated total inertia, the current controller dynamic response, and loop pure time delays and set a first candidate value gain equal to the initial candidate value;
    a module (f) for generating a Frequency Response Function that represents the system plant Frequency Response Function multiplied by the current controller Frequency Response Function and loop pure time delays Frequency Response Functions and the candidate value gain;
    a module (g) for selecting a combination of current set-point filters that suppresses an amplitude at resonant frequencies to just meet a restriction for minimum gain margin;
    a module (h) for reducing the candidate value gain to satisfy the global minimum gain margin criterion and designating reduced candidate value as a final candidate value;
    a module (i) for optimizing using golden section search algorithm to determine a next candidate value; and
    a module (j) for converging to the final candidate value by iterating the candidate value to the next candidate value and repeating through modules (f) through (j).

8. A system of claim 7, wherein the minimum gain margin includes all open loop amplitudes at detected resonances for frequencies above a fraction of the frequency where the phase transverses −180 degrees.

9. A system of claim 7, wherein the minimum gain margin is set as a parameter to the tuning strategy.

10. A system of claim 7, wherein reducing the candidate value includes ensuring that the amplitude is always at or below 1.0.

11. A system of claim 7, wherein the system is used to design the filters for the closed loop system based on the candidate gain.

12. A system of claim 7, wherein the module for estimating the total inertia of the system involves estimating by using a least squares criterion to fit a low frequency portion of the speed controller to a function that represents a pure inertia exposed to viscous damping.

13. A system of claim 7, wherein the module for generating the Frequency Response Function of the system involves exciting the system over a range of possibly relevant frequencies and collecting measurements of the system and estimating generating the Frequency Response Function of the system.

14. A method for design of filters and loop proportional gain for a closed loop system comprising the actions of:
    (a) generating a Frequency Response Function Gum_Vm(s) of the system;
    (b) determining one or more resonant and anti-resonant frequencies of the system by identify poles and zeros of Gum_Vm(s);
    (c) estimating the total inertia of the system;
    (d) generating a Frequency Response Function for a current controller and loop pure time delays for the system Gcurr(s);
    (e) determining a lower limit and an upper limit, and an initial candidate value $K_p$ based on the estimated total inertia and Gcurr(s);
    (f) generating a Frequency Response Function that represents Cv(s)*Gcurr(s)*$K_p$; wherein Cv(s) is the speed compensator function;

(g) selecting a combination of current set-point filters F(s) that suppresses an amplitude at resonant frequencies to just meet a restriction for minimum gain margin;

(h) reducing $K_p$ to meet the global minimum gain margin criterion and designating the reduced $K_p$ as $K_{p\_final}$;

(i) optimizing using golden section search algorithm to determine a next candidate value of $K_p$; and (j) converging to a $K_{p\_final}$ by iterating $K_p$ and repeating action (f) through (j).

15. A method of claim 14, wherein the minimum gain margin includes all open loop amplitudes for frequencies above the frequency where the phase transverses −180 degrees.

16. A method of claim 14, wherein reducing the candidate value includes ensuring that the amplitude is always at or below 1.0.

17. A method of claim 14, wherein the action of estimating the total inertia of the system involves estimating by using a least squares criterion to fit a low frequency portion of the speed controller Gum_vm to a function that represents a pure inertia exposed to viscous damping.

18. A method of claim 14, wherein the action of generating the Frequency Response Function of the system involves exciting the system of a range of frequencies and collecting measurements of the system and analytically generating the Frequency Response Function of the system.

* * * * *